Figure 1:
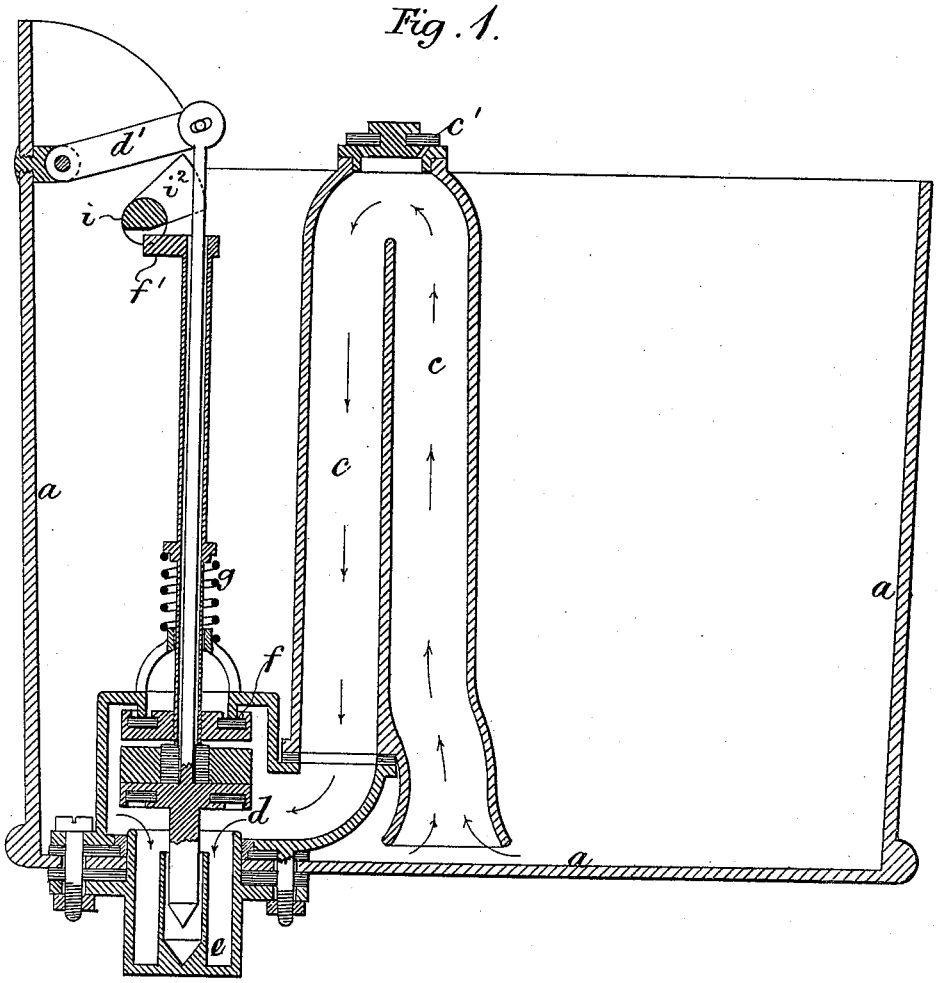

(No Model.) 5 Sheets—Sheet 1.

G. H. & S. JENNINGS & J. MORLEY.
APPLIANCE AND ARRANGEMENT FOR CONTROLLING, REGULATING, AND ARRESTING THE SUPPLY OF WATER FOR SANITARY PURPOSES.

No. 326,431. Patented Sept. 15, 1885.

(No Model.) 5 Sheets—Sheet 2.

G. H. & S. JENNINGS & J. MORLEY.
APPLIANCE AND ARRANGEMENT FOR CONTROLLING, REGULATING, AND ARRESTING THE SUPPLY OF WATER FOR SANITARY PURPOSES.

No. 326,431. Patented Sept. 15, 1885.

Witnesses
Inventors (No Model.) 5 Sheets—Sheet 3.
G. H. & S. JENNINGS & J. MORLEY.
APPLIANCE AND ARRANGEMENT FOR CONTROLLING, REGULATING, AND ARRESTING THE SUPPLY OF WATER FOR SANITARY PURPOSES.
No. 326,431. Patented Sept. 15, 1885.
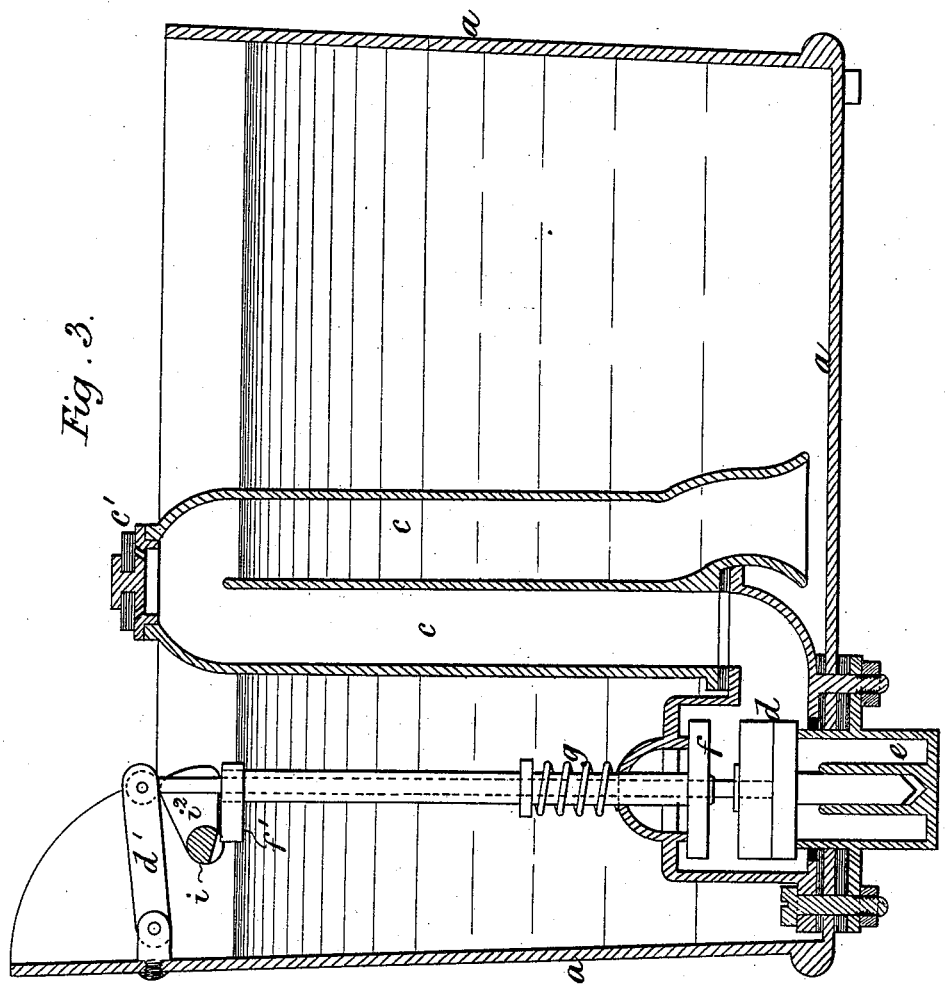

(No Model.) 5 Sheets—Sheet 4.
G. H. & S. JENNINGS & J. MORLEY.
APPLIANCE AND ARRANGEMENT FOR CONTROLLING, REGULATING, AND ARRESTING THE SUPPLY OF WATER FOR SANITARY PURPOSES.
No. 326,431. Patented Sept. 15, 1885.
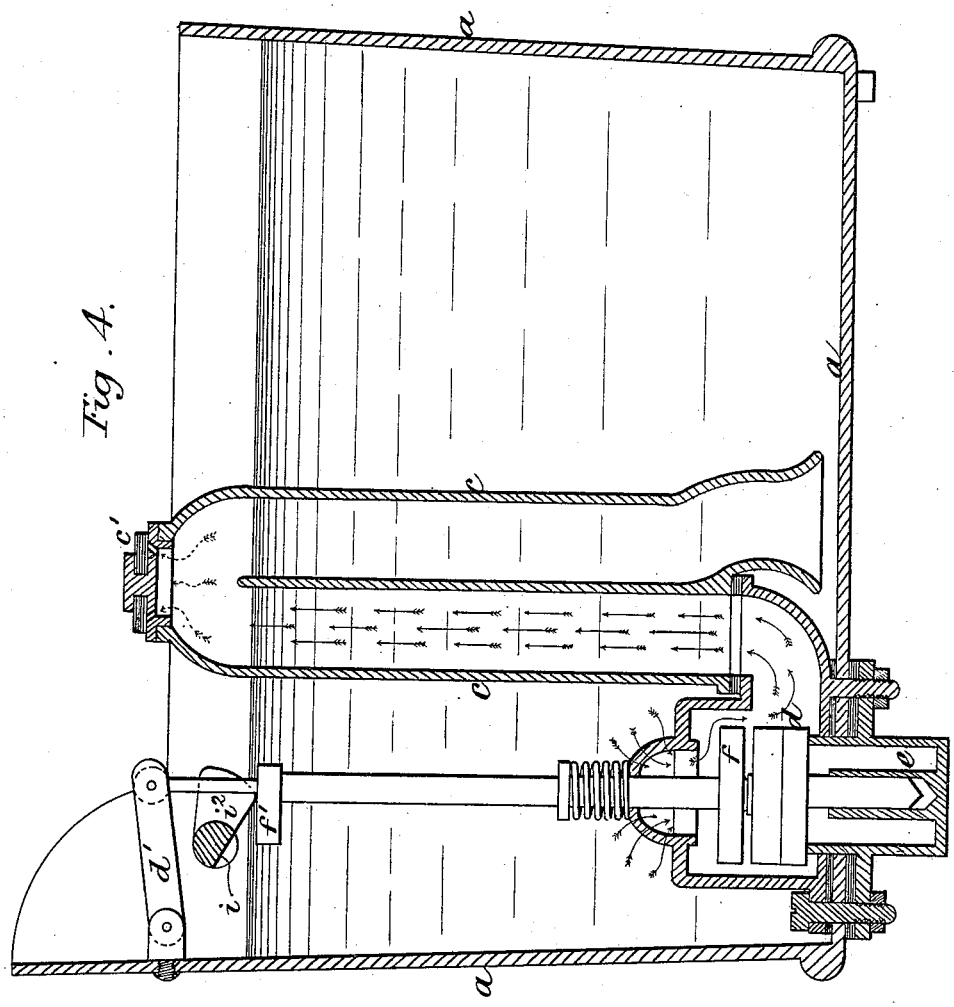

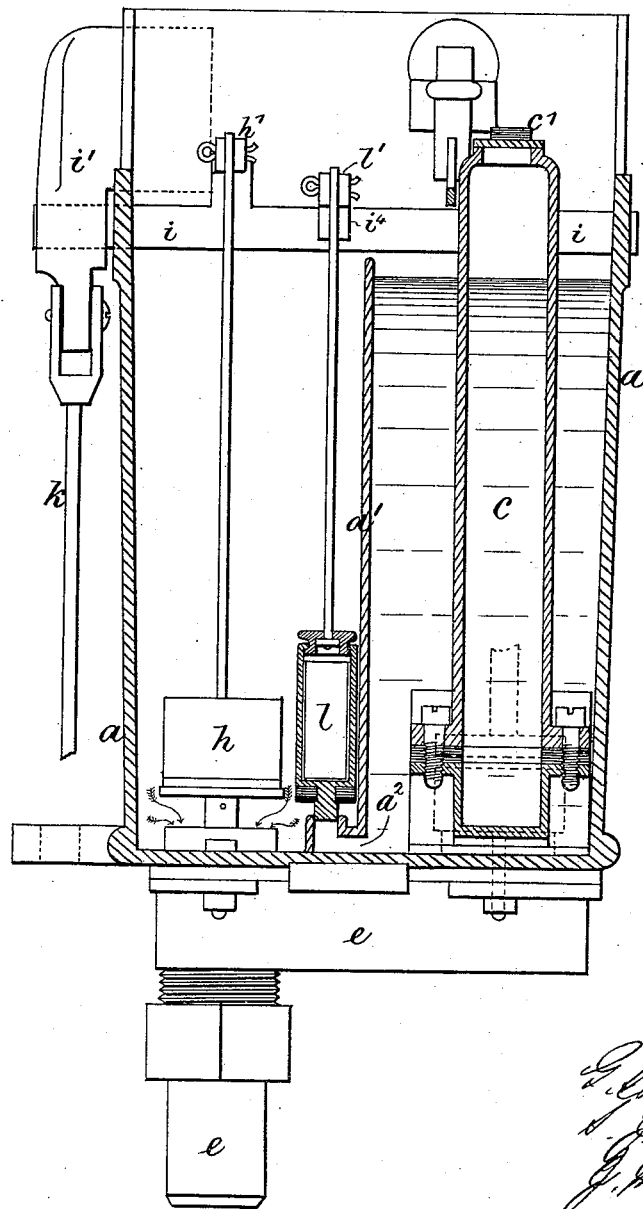

UNITED STATES PATENT OFFICE.

GEORGE HENRY JENNINGS AND SIDNEY JENNINGS, OF PALACE ROAD, LAMBETH, COUNTY OF SURREY, AND JOHN MORLEY, OF BETHNAL GREEN ROAD, COUNTY OF MIDDLESEX, ENGLAND.

APPLIANCES AND ARRANGEMENTS FOR CONTROLLING, REGULATING, AND ARRESTING THE SUPPLY OF WATER FOR SANITARY PURPOSES.

SPECIFICATION forming part of Letters Patent No. 326,431, dated September 15, 1885.

Application filed September 30, 1884. (No model.) Patented in England June 28, 1884, No. 9,552.

*To all whom it may concern:*

Be it known that we, GEORGE HENRY JENNINGS and SIDNEY JENNINGS, both of Palace Road, Lambeth, in the county of Surrey, England, sanitary engineers, and JOHN MORLEY, of 258 Bethnal Green Road, in the county of Middlesex, England, brass-finisher, subjects of the Queen of Great Britain, have invented certain new and useful Improvements in Appliances and Arrangements for Controlling, Regulating, and Arresting the Supply of Water for Sanitary Purposes and Preventing Waste, (for which we have secured Letters Patent in Great Britain, No. 9,552, dated June 28, 1884,) of which the following is a specification.

This invention has for its object improvements in appliances and arrangements for controlling, regulating, and arresting the supply of water for sanitary purposes and preventing waste.

Our improved appliances and arrangements are applicable especially in those cases in which a measured quantity of water is required to be delivered in two separate flows, the first flow being determined by the movement of a lever or handle, and the second or after flow being determined by the release of the said lever or handle.

We employ a measuring-cistern, which is divided into two parts by a partition. The two parts communicate by a passage through the lower part of the partition, in connection with which passage a valve is provided. In one of the compartments of the cistern a ball-valve is fitted for filling the measuring-cistern from a main or from a cistern of larger capacity. In the same compartment of the measuring-cistern, also, there is a siphon having its mouth near to the bottom of the cistern. It delivers by a passage controlled by a valve into the pipe through which it is desired that the water should be delivered by the apparatus. The descending limb of the siphon is also open to the cistern near its lower end by a passage provided with a valve, which, when the apparatus is out of action, is held up to its seat by a spring or by a weighted lever. This valve is upon a hollow rod, and another rod connected with the first-mentioned valve passes down through it. The other compartment of the cistern also has an opening in the bottom provided with a valve, which, when lifted, permits the water to escape and be delivered from this compartment into the delivery-pipe.

There is a horizontal axis passing through the cistern from side to side at its upper part, and cams or projections on this axis operate the several valves mentioned above. The axis has a lever upon it weighted at one end, and to the other end a draw-rod is attached. When this rod is pulled downward, the apparatus is set in action, and when it is allowed to return by the action of the weight the second quantity of water, or the after flow, is delivered.

When the apparatus is at rest, the valve by which one compartment of the cistern communicates with the other is open, and so is the valve by which the siphon communicates with the delivery-pipe. The other valves are closed. Both compartments of the cistern then fill with water delivered by the ball-valve.

When the axis with the tappets upon it is rotated by the downward pull of the draw-rod, it operates to close the valve by which one compartment of the cistern communicates with the other, shuts the bottom and opens the top valve, connecting the descending limb of the siphon with the cistern. This limb then fills to the level of the water in the cistern, the air being able to escape from the siphon at the top by a small valve provided for the purpose. The valve connecting the other compartment of the cistern with the delivery-pipe is now opened by its appropriate tappet, and the first flow of water takes place and continues until the lever or handle is released or until this compartment of the cistern is empty. When the weighted lever and its axis, with the tappets upon it, is allowed to return, the valve by which the main flow is delivered closes and the valve connecting the siphon with the delivery-pipe is lifted, the valve connecting this limb of the siphon directly with the cistern being at the same time closed. The partial vacuum produced by the descending water in the delivery-pipe at once starts the siphon, and the second quantity of water is delivered.

In order that our said invention may be most fully understood and readily carried into effect, we will proceed to describe the drawings hereunto annexed.

Figure 2:
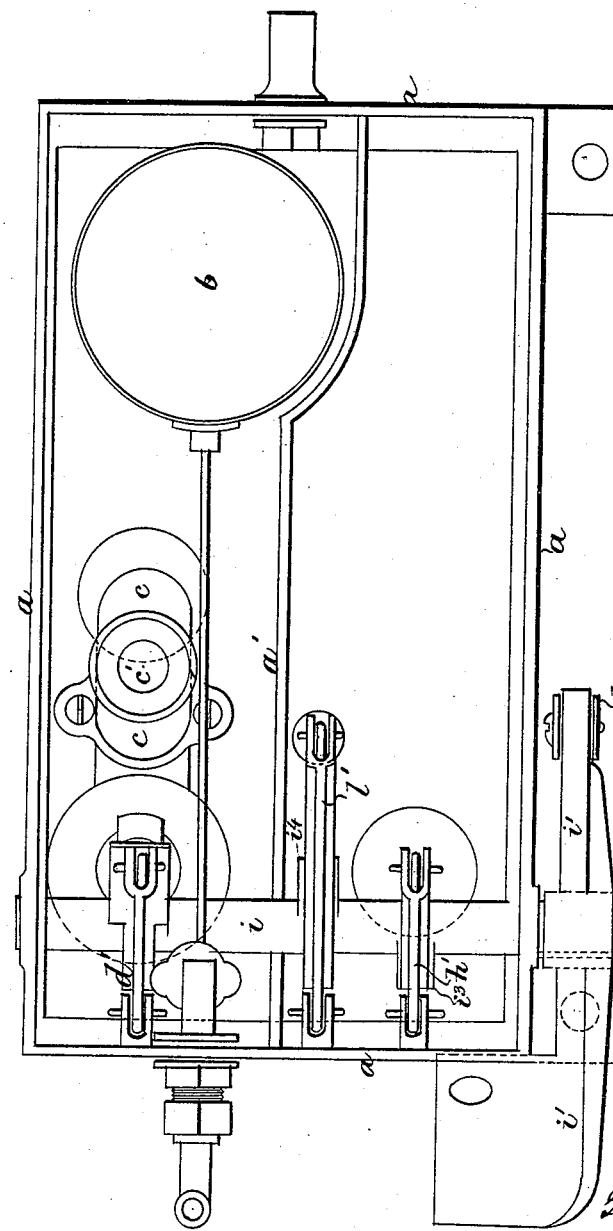

In the drawings, Figure 1 is a longitudinal section of an apparatus constructed in accordance with our invention. Fig. 2 is a plan. Figs. 3 and 4 are longitudinal sections showing the parts in other positions. Fig. 5 is a transverse section.

$a$ is a cistern of a capacity to contain the total quantity of water to be delivered at each operation.

$a'$ is a partition dividing the cistern longitudinally into two compartments.

$a^2$ is a passage from one compartment of the cistern to the other.

$b$ is a ball-float controlling in the usual way a valve by which the cistern is filled from a main or other source.

$c$ is a siphon in the same compartment. When in action, it delivers past a delivery-valve, $d$, into the outlet $e$, which is connected with the water-closet pan or other place where the water is required.

$c'$ is an air-valve, which will open to allow air to escape from the top of the siphon, but closes against the entrance of air.

$f$ is a valve shutting against a seat above it. When the valve $f$ is away from its seat, both limbs of the siphon are open to the cistern $a$. The spring $g$, bearing against a collar on the hollow stem of the valve $f$, and abutting below upon the valve-case, tends to keep this valve to its seat.

$h$ is a delivery-valve in the other compartment of the cistern, which, when open, allows water to pass from this compartment to the outlet $e$.

$i$ is an axis passing through holes in the sides of the cistern above the water-level. It has a weighted lever, $i'$, fixed upon its end. By a draw-rod, $k$, attached to the end of the lever the axis can be turned partly round, and this causes the apparatus to operate. Immediately the draw-rod is released the weighted end of the lever preponderating causes the axis to return to its original position.

$l$ is a valve serving to close and open the passage $a^2$.

The axis $i$ has upon it several cams or projections, which, when the axis is turned, act upon levers and parts connected with the valves.

The valve $d$ is connected by its rod with a lever, $d'$, and this rests upon a tappet, $i^2$, on the axis $i$.

The hollow stem or rod of the valve $f$ has a head, $f'$, and this is immediately beneath the same tappet $i^2$ on the axis.

The valve $h$ is connected by its rod with the lever $h'$, and this is immediately over the tappet $i^3$ on the axis $i$. In like manner the valve $l$ is connected by its rod with the lever $l'$, which is immediately over the tappet $i^4$ on the axis.

Fig. 1 represents the parts in the position they occupy at the commencement of the operation. At this time the cistern fills, and, the valve $l$ being raised, the water passes to both compartments of the cistern.

When the axis $i$ is rotated by the pull of the draw-rod $k$, the tappets on the axis alter the positions of the several valves, as follows: The tappet $i^4$ ceases to support the lever $l'$, and the valve $l$ falls to its seat. The tappet $i^3$ lifts the lever $h'$, the valve $h$ is lifted and discharges the water from its compartment of the cistern. While this is taking place the tappet $i^2$ ceases to support the lever $d'$, to which valve $d$ is connected, and this valve falls to its seat, as represented in Fig. 3. Then the same tappet comes down upon and depresses the head $f'$, and forces the valve $f$ from its seat, as represented in Fig. 4. The siphon then becomes charged. On the release of the draw-rod all the parts return to their original positions, and when the position indicated in Fig. 1 is regained the siphon $c$ is able to discharge its compartment of the cistern, and delivers the second or after flow. The siphon empties the compartment of the cistern, and then prevents the escape of water, while the cistern refills, although the valve $d$ remains open.

Having now particularly described and ascertained the nature of our said invention and in what manner the same is to be performed, we declare that what we claim is—

1. The combination of the cistern divided by a partition into two compartments, the outlet for each compartment, the valve for each outlet, the ball-cock supplying one of the compartments, the delivery-siphon in the same compartment, a passage fitted with a valve by which water passes from one compartment to the other, and the axis and lever by connections with which the said valves are controlled, substantially as and for the purpose set forth.

2. The combination of the cistern divided by a partition into two compartments, the separate outlets and their controlling-valves for the respective compartments, the passage fitted with a valve by which water passes from one compartment of the cistern to the other, and the axis and lever by connections with which the said valves are controlled, substantially as and for the purpose set forth.

GEORGE HENRY JENNINGS.
SIDNEY JENNINGS.
JOHN MORLEY.

Witnesses:
CARL NEUMANN,
*Palace Wharf, Stangate, Lambeth, London, Clerk.*

J. WILMER M. HARRIS,
*Notary Public, 17 Gracechurch Street, London, E. C.*